W. C. BAXTER.
PIPE.
APPLICATION FILED SEPT. 21, 1910.

981,910.

Patented Jan. 17, 1911.

Witnesses.
Harry Opsahl.
E. C. Skinkle.

Inventor:
William C. Baxter.
By his Attorneys.
William Merchant

THE NORRIS PETERS CO., WASHINGTON, D. C.

UNITED STATES PATENT OFFICE.

WILLIAM C. BAXTER, OF WASHINGTON, DISTRICT OF COLUMBIA.

PIPE.

981,910. Specification of Letters Patent. Patented Jan. 17, 1911.

Application filed September 21, 1910. Serial No. 582,984.

*To all whom it may concern:*

Be it known that I, WILLIAM C. BAXTER, a citizen of the United States, residing at Washington, District of Columbia, have invented certain new and useful Improvements in Pipes; and I do hereby declare the following to be a full, clear, and exact description of the invention, such as will enable others skilled in the art to which it appertains to make and use the same.

My invention has for its object to provide an improved smoking pipe, and to this end the invention consists of the novel devices and combination of devices hereinafter described and defined in the claim.

In the accompanying drawings which illustrate the invention, like characters indicate like parts throughout the several views.

Figure 1:
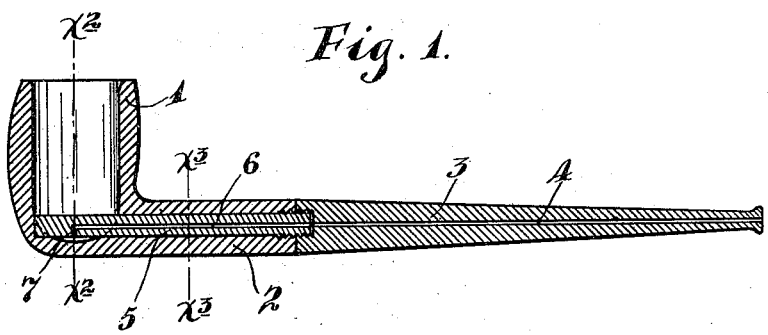
Figure 2:
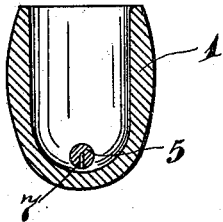
Figure 3:
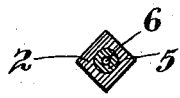

Referring to the drawings; Figure 1 is a vertical section taken centrally and longitudinally through the pipe designed in accordance with my invention; Fig. 2 is a transverse section taken on the line $x^2$ $x^2$ of Fig. 1; and Fig. 3 is a transverse section taken on the line $x^3$ $x^3$ of Fig. 1.

My invention may take various forms, but is preferred as shown. The pipe bowl 1 is provided with a short integrally formed stem 2 that is connected to a mouth piece 3 having the usual draft passage 4. The pipe stem 2 is provided with a much larger axial passage than is customary and detachably seated therein is a draft tube 5, the threaded outer end of which, as shown, has threaded engagement both with the outer end of the stem 2 and with the inner end of the mouth piece 3. The outer extremity of the draft passage 6 of the tube 5 communicates with the inner extremity of the passage 4 of the mouth piece 3. The inner extremity of the said draft passage 6 is extended vertically downward at 7 and opens through the bottom of the tube 5 in line with the axis of the bowl 1. The cavity of the bowl 1 extends below the open lower extremity 7 of the tube passage 6 so that free draft is afforded. With this arrangement, the extremity of the draft passage 6 is kept out of contact with the tobacco in the pipe bowl and has an upward extension from the bowl instead of a downward or lateral extension. This prevents the said passage from being clogged by tobacco, dust, or fine particles, and prevents nicotin from collecting therein, at the same time it gives a simple down draft in the bowl. Furthermore, that portion of the bowl cavity which underlies the tube 5, forms a sort of an expanded extension of the draft passage, and prevents the draft from being concentrated at the very axis of the bowl, and evenly distributes the draft throughout the bowl.

The pipe may be very easily and thoroughly cleaned simply by removing the tube 5 from the pipe.

As indicated, the pipe may take various forms and the improved draft tube may be applied thereto in different ways. The important feature is that the draft tube be detachable from the pipe for cleaning purposes and that when inserted into the pipe its inner end will project into the bowl with the inner extremity of the draft passage of the said tube opening at the bottom of the bowl.

What I claim is:

A pipe having a removable draft tube telescoped through the stem thereof and projecting into the bowl cavity and provided with a draft passage the inner extremity of which is extended downward and opens at the lower portion of said stem, approximately at the axis of the bowl and slightly above the bottom of the bowl cavity.

In testimony whereof I affix my signature in presence of two witnesses.

WILLIAM C. BAXTER.

Witnesses:
HARRY D. KILGORE,
F. D. MERCHANT.